July 18, 1950 R. E. FEARON ET AL 2,515,502
NEUTRON WELL LOGGING
Filed July 10, 1948 4 Sheets-Sheet 1

Inventors
GILBERT SWIFT,
ROBERT E. FEARON AND
JEAN M. THAYER
By James Y. Cleveland
Attorney July 18, 1950 R. E. FEARON ET AL 2,515,502
NEUTRON WELL LOGGING
Filed July 10, 1948 4 Sheets-Sheet 2

Inventors
GILBERT SWIFT
ROBERT E. FEARON AND
JEAN M. THAYER
By James Y. Cleveland
Attorney

July 18, 1950  R. E. FEARON ET AL  2,515,502
NEUTRON WELL LOGGING

Filed July 10, 1948  4 Sheets-Sheet 4

Inventors
GILBERT SWIFT,
ROBERT E. FEARON AND
JEAN M. THAYER
By James Y. Cleveland.
Attorney

Patented July 18, 1950

2,515,502

UNITED STATES PATENT OFFICE 2,515,502

NEUTRON WELL LOGGING

Robert E. Fearon, Jean M. Thayer, and Gilbert Swift, Tulsa, Okla., assignors to Well Surveys, Incorporated, Tulsa, Okla., a corporation of Delaware Application July 10, 1948, Serial No. 38,137

4 Claims. (Cl. 250—83.6)

This invention relates to the art of subsurface exploration, principally oil well logging, and more particularly to a radioactivity type of exploration in which a source of fast neutrons is used in conjunction with a gamma-ray detector. Commercially such a radioactivity log made by the use of a source of fast neutrons and a gamma-ray detector is known as a neutron log. This is true despite the fact that no neutrons are directly detected.

In recent years neutron oil well logs have achieved a degree of popularity not shared by the logs made by other methods. This is believed to be attributable to the fact that, in a substantial proportion of surveys made, they correlate more accurately with the lithology of the strata penetrated by the well. These logs have been made by traversing the well with a source of neutrons, usually 300 to 500 millicuries of radium intimately mixed with a predominant proportion by weight of powdered beryllium, to irradiate with fast neutrons the strata lining the well, and simultaneously traversing the well with an associated gamma-ray detector to detect and record gamma rays in correlation with the depth at which they are detected. The detector, for example an ionization chamber, and the source are assembled to make a single unit, with the detector vertically spaced from the source.

By extensive experimentation we have discovered that the neutron log does not in many important instances adequately depict the lithologic properties of the strata surveyed. We have carefully investigated and correlated numerous instances of this kind and, as a result of exhaustive study and experimentation, we believe that we have now found the solution to this problem and have discovered how to make adequate neutron logs of oil wells, and analogous subsurface passages, in virtually all instances.

One of the facts which we have discovered is that prior workers have not, in making and interpreting their logs, taken into consideration the variation in scattering from point to point in the well of the primary gamma radiation emitted by the neutron source and detected by the ionization chamber along with the gamma radiation resulting from the neutron processes occurring in the strata. We have found that this a very important factor.

The radium-beryllium source, which has been accepted as a standard neutron source by those working in the art, is composed of an alpha rayer in the form of radium, atomic number 88 and mass number 226, in secular equilibrium with its daughter products, intimately mixed with a target material, beryllium. The mixture is enclosed in a metallic capsule which in turn is surrounded by a lead shield made as thick as practical, the diameter of the wells to be logged being the limiting factor. The lead shield is used as an attenuator of gamma radiation which is emitted by the source mixture along with the neutrons. We have found, however, that such a source emits gamma radiation far in excess of that which we have found permissible in making uniformly good logs under various well conditions.

We have also investigated the effect of gamma rays naturally emitted by the strata penetrated by a well, and we have found that the ionizing processes which they cause to occur in the detector are ordinarily small in comparison with those occurring due to the primary radiation when a conventional source of neutrons sufficiently strong for satisfactory logging is used. Therefore, no further reference will be made to them in this application.

In addition to our above mentioned discovery that primary gamma radiation from the radium-beryllium source is responsible in an important way for serious inadequacies in the logs, we have further discovered that a good neutron log can be made in virtually any bore hole by employing neutrons largely free from accompanying gamma radiation, and by otherwise following the disclosure of this application.

Pure radium, atomic number 88 and mass number 226, would be ideally suited for use in such a neutron source, because it can be used to provide neutrons and it does not emit gamma radiation. Radium, however, does not remain in a pure state for the reason that it is continually decaying to form daughter products, some of which are strong gamma rayers. Radium therefore goes into secular equilibrium with its daughter products. The nuclear processes which are continually taking place in radium are as follows:

Radium, atomic number 88 and mass number 226, is an alpha rayer which emits alpha rays of from 4 to 5 m. e. v. energy and in so doing decays to form radon, a gas. Radon also emits alpha radiation. The capsule in which the source material is contained retains this radon gas as it is formed, and it goes to equilibrium. Radon is a powerful alpha rayer, giving off alpha rays of 6 m. e. v. energy. In emitting alpha rays of this energy it decays to radium A, which is also an alpha rayer. Radium A, by the emission of alpha radiation, decays to radium B. Radium B is a beta and a gamma rayer. The energy of the gamma radiation given off by radium B is approximately 0.5 m. e. v. Radium B decays into radium C which is, for the greater part, also a beta rayer and gamma rayer. The gamma radiation given off by radium C has an energy of about 2.1 m. e. v. 99.65% of radium C decays by the emission of beta radiation to form radium C', and the remaining 0.35% decays by the emission of both alpha and gamma rays to form radium C''. Radium C', by the emission of alpha radiation, decays to form radium D, and radium C'', by the emission of beta radiation, also decays to form radium D. Radium D decays by the emission of beta and gamma radiation to form radium E. This gamma radiation is very soft, having an energy of only 0.047 m. e. v. Radium E, by the emission of beta radiation, decays to form radium F, and radium F in turn, by the emission of alpha radiation, decays to form lead, atomic number 82 and mass number 206, which is stable.

Since all of the elements in the above series are in secular equilibrium, it can be seen that there are present some daughter products which emit hard gamma radiation which cannot be greatly attenuated by a lead shield of practical dimensions which would fit into a well. Those hard bamma rays which are not absorbed by the shield enter the walls of the well and are scattered thereby, and some of them reach the detector where they are detected.

The beta radiation emitted by certain of the above daughter products when stopped by a target material produces gamma rays of about 0.6 m. e. v. This action is comparable to that of an X-ray tube, the stopping material being the target. The chances of stopping a beta ray to produce gamma rays are, however, small, about one in 1000, and we have found that this phenomena is not of significant importance in the neutron logging process.

The nuclear reaction which occurs in the source capsule which produces fast neutrons is $$_2He^4 \text{ (alpha particle)} + _4Be^9 \text{ (beryllium)} \rightarrow \\ _6C^{12} \text{ (carbon)} + _0N^1 \text{ (neutron)} + \\ h\nu \text{ (gamma radiation)}$$

The neutrons produced by the above reaction have an energy of approximately 5 m. e. v. For every neutron produced by the above reaction a photon of gamma radiation having an energy of approximately 3 m. e. v. is produced. Gamma radiation of this energy can be filtered with a practical amount of lead shield, commensurate with drill hole dimensions, to about one gamma ray to four neutrons.

We have discovered that these last mentioned two sources of gamma radiation, viz., gamma rays produced by beta ray and alpha ray impingement on target material are tolerable in good neutron logging. The gamma radiation which we have discovered not to be tolerable is that originating with the equilibrium mixture of the radium and its daughter products. To summarize, the significant gamma radiation emitted by the radium-beryllium source is, first, gamma radiation originating with the radium and its daughter products of approximately 2 m. e. v. energy, and, second, gamma radiation resulting from the nuclear reaction of the alpha rays and beryllium of approximately 3 m. e. v. The gamma rays given off by the radium and its daughter products are about 5000 times more numerous than the neutrons produced by the nuclear reaction of alpha rays and beryllium.

With a practical thickness of lead shield surrounding a standard radium-beryllium source, about 1000 of the gamma rays per neutron are emitted from the exterior of the shield. This gamma radiation is scattered by the formations in the vicinity of the source, and some of the scattered radiation reaches the detector in varying amounts and is recorded, along with the desired gamma radiation produced by neutron reactions in the strata. In many cases, the scattered gamma radiation reaching the detector is substantially constant for all portions of the well. In these cases neutron logs can be made with the radium-beryllium source which are reliable and which truly correlate with the geology of the strata penetrated by the wells. This is due to the fact that the ionizing processes occurring in the detector which are produced by the scattered gamma rays are at a substantially constant rate resulting in a correspondingly constant flow of output current in the electrode circuit of the detector. Under these circumstances the ionizing processes in the detector produced by the desired gamma radiation resulting from neutron reactions in the strata, and which vary in rate in accordance with lithological characteristics of the strata, will be superimposed on those due to the scattered gamma radiation which originates in the neutron source. The output current from the detector then is composed of two components: one of substantially constant magnitude, that due to detected scattered gamma radiation, and one varying in magnitude in accordance with the lithological characteristics of the strata, that due to gamma radiation produced by neutron reactions occurring in the strata. Only in such cases can a neutron log be made with such a source that accurately represents the lithological characteristics of the formations. There is no way of determining from the log itself before, during, or after the making of the log if the well is one of this type. This is a very important consideration, because frequently there is no way of knowing whether the log is or is not an accurate log.

Usually, while logging with a standard radium-beryllium source, the gamma radiation emitted by the source is scattered by the walls of the wells and reaches the detector in an amount which depends upon the size of the boring, the character of the rocks (largely density), the thickness of the casing, the density of fluid in the well, and possibly to a small extent upon other factors. Since these factors vary with depth in a manner which does not necessarily agree with, but is often opposite to, the properties of the formations which cause the neutron reactions, the result is to obscure, nullify, and often reverse the deflections of the log that are due to detected gamma radiation which is produced by neutron reactions in the formations. In particular, all moderately small deflections are subject to suspicion since ordinarily it cannot be determined whether they are due to changes in the porosity or other factors affecting the neutron reactions in the formations, or are due to such factors as slight changes in diameter of the well or density of the formations which change the amount of scattered gamma radiation.

We have discovered and demonstrated that we can make a good log using a neutron source which does in fact emit some gamma radiation provided, however, that the variation of the detected gamma radiation recorded on the log and resulting from neutron reactions occurring in the formations are sufficiently greater than the variations of detected scattered gamma radiation which originates with the neutron source that the true lithological characteristics of the formations as depicted by the gamma radiation resulting from the neutron reactions in the formation will not be obscured.

Following our above described discoveries concerning the effect and tolerability of gamma radiation emanating from the neutron source, we have discovered a method of making good neutron logs in virtually any well or bore hole. The method which we have discovered depends upon the provision of particular types of neutron sources. The term "sources" is used here to include the neutron producing reactants, and their container and all shields, in other words, everything that is inside the outer surface of the source enclosure.

We have discovered that radium F, as an alpha rayer, and beryllium, as a target material, constitute an excellent source of neutrons for the purpose of this application. Radium F is ideally suited for the reason that it gives off no gamma radiation and has no daughter products which emit gamma radiation. Radium F, however, has a short half-life, 140 days, and for this reason must be replaced too often to make it alone an entirely satisfactory source of alpha radiation.

We have, however, found a solution to this problem. We have discovered and demonstrated how to provide a source, having all the advantages of radium F and avoiding the serious disadvantage noted above, and at the same time being free from any new disadvantage. In accordance with our invention an adequate source of neutrons is provided which is substantially constant over a long period and is free from non-tolerable undesired phenomena.

One embodiment of this aspect of our invention involves the use of radium D. Radium D, as pointed out above, decays by the emission of beta radiation to radium E. The half-life of radium D is approximately 22 years. It is, however, not an alpha rayer. Radium E, a daughter product of radium D, by the emission of beta radiation decays to radium F, polonium, the desired alpha rayer. Since radium D, E and F, as well as radium G, stable lead, are in secular equilibrium, the supply of radium F is continually being replenished. The result is that, by using radium D in the source, we provide an alpha rayer, radium F, which in effect has a half-life of 22 years. Radium D and E emit substantially no gamma radiation. Any gamma radiation given off by radium D and E is soft and can be attenuated with a minimum of shielding, and presents no problem whatever in the design of a practical source. Such a source would still emit gamma radiation which results from the alpha ray–beryllium reaction that produces the fast neutrons. This gamma radiation when emitted by the reactant materials has an energy of approximately 3 m. e. v. Gamma radiation of such energy cannot be greatly attenuated with a lead shield of practical thickness. It can, however, be reduced to approximately one quanta of gamma radiation for every four neutrons emitted. We have determined that this proportion of gamma radiation is well within tolerable limits. Compared to the standard source, that which utilizes as reactant materials radium (atomic number 88 and mass number 226), in secular equilibrium with its daughter products, and beryllium, the source above discussed embodying our invention is approximately 5000 times better from the point of view of quanta of gamma radiation per neutron emitted from the exterior surface thereof.

It will be noted that, in discussion of neutron sources, the prior art has heretofore regarded a great variety of alpha rayers with a variety of target materials as equivalents when used as reactant materials for producing fast neutrons. A consideration of the above facts will show that such an assumption of equivalence between such materials as radium (atomic number 88 and mass number 226), in secular equilibrium with its daughter products, and radium F, both working upon beryllium targets, would be completely fallacious.

A practical source, which approaches what we have found to be the upper tolerable limit of the proportion of photons of gamma radiation emitted to neutrons emitted, may be defined as one which emits 500 times less gamma radiation than the standard neutron source, namely, the source which utilizes radium, (atomic number 88 and mass number 226), in secular equilibrium with its daughter products, and beryllium as reactant materials. There is radiated from the outside of the shield of the standard neutron source about 1000 quanta of gamma radiation for each neutron that is emitted. We have found that, in a satisfactory source, two quanta of gamma radiation for each neutron emitted can be tolerated. Such a source, although approximately 8 times worse than our radium D—beryllium source described above, is believed still to be within tolerable limits, but not necessarily the equivalent of our preferred sources for all purposes. A source whose gamma radiation does not exceed the tolerable limits described above is sometimes referred to hereinafter as a source substantially free from gamma radiation.

Another embodiment of this aspect of our invention utilizes actinium (atomic number 89 and mass number 227), in secular equilibrium with its daughter products, as an alpha rayer, and beryllium as a target material. Actinium has five alpha rayers among its daughter products in secular equilibrium with it. The energy of the alpha radiation given off by each of these five members is about 1 m. e .v. higher than the alpha radiation emitted by radium (atomic number 88 and mass number 226), and each of its daughter products. Additionally, since the alpha radiation from actinium is more energetic than that from the members of the radium series, the mixture of actinium and beryllium does not need to be as intimate as the mixture of radium and beryllium. The number of gamma rayers in that part of the actinium series that is of interest is comparable to that of the radium series. However, the highest energy of the gamma rays emitted by the actinium series is quite low by comparison, lying between 0.3 and 0.4 m. e. v. We can without difficulty provide a lead shield of practical dimensions for well logging which will attenuate this gamma radiation. One inch of lead will adequately attenuate this gamma radiation.

Another aspect of our invention is that an extremely small source can be used, or actinium in very impure state can be used. Actinium in secular equilibrium with its daughter products is approximately two times better than radium (atomic number 88 and mass number 226), in secular equilibrium with its daughter products, per millicurie of activity for producing neutrons and approximately 12 times better than radium D, in secular equilibrium with its daughter products, per millicurie of activity. The weight ratio for equal radioactivity units of actinium to radium D is 13.5/22. The weight ratio, for equal radioactivity units, of actinium to radium (atomic number 88 and mass number 226), is 13.5/1590. Therefore, weight for weight, actinium bears a neutron producing ratio to radium of 3180/13.5, or approximately 235. This means that, in accordance with our invention, it is possible to use actinium which is approximately 235 times less pure than radium in the same space and with equal results from the point of view of quantity of neutrons produced. Due to the need for less thickness of shield by a factor of 10, 100 times as much space becomes available for the source material. Therefore, actinium can have a degree of impurity which is one part actinium in 23,500, so long as the impurities are not gamma rayers. Such an alpha rayer, when used with beryllium, and the mixture provided with a practical amount of lead shielding, compares favorably with radium D, in secular equilibrium with its daughter products, as to the gamma radiation and neutrons emitted from the outer surface of the source.

Although beryllium has been recited above as a target material it is to be understood that other light materials such as lithium and boron can be used.

A well-logging neutron source which employs any of the above neutron-producing reactants, which are described as illustrative embodiments of our invention, and a practical gamma-radiation attenuating shield, would thus fall within the limits of toleration defined above for a practical source for the purposes of this invention.

The primary object of this invention is the provision of method and apparatus for producing neutron logs which accurately and consistently depict the lithological characteristics of the formations penetrated by bore holes. It is an object of this invention to provide method and apparatus, comprising a source of neutrons, for obtaining a log of subsurface formations which corresponds to neutron reactions occurring in the formations which are occasioned by neutrons emanating from the source.

It is further an object of the invention to delineate the effect on neutron logs of gamma radiation other than that produced by desired neutron reactions in the formations, and to identify and eliminate the most damaging source of this undesired radiation. It is also a purpose of this invention to apprehend and evaluate all undesired gamma radiation, to determine tolerable limits, and to provide method and apparatus for restricting same within such limits, including the provision of shielding where such means is effective in attaining said tolerable limits.

An important object of this invention is to define and provide a class of neutron sources by means of which accurate neutron logs can reliably be produced. It is an object of the invention to provide economically and scientifically practicable neutron sources of adequate permanence and strength which are essentially or tolerably free of gamma ray emission. Specifically, it is an object of the invention to provide a neutron source which employs radium D, in secular equilibrium with its daughter products and a material such as beryllium, as neutron producing reactant materials; a neutron source which employs actinium (atomic number 89 and mass number 227), in secular equilibrium with its daughter products, and a material such as beryllium, as neutron producing reactant materials; and a neutron source which employs polonium and a material, such as beryllium, as neutron producing reactant materials. It is a further object to provide said actinium source in notably small physical dimensions, if desired. It is also an object to provide the said actinium source in proper strength and quality, but nevertheless in highly impure state as regards the actinium alpha rayer, provided the impurities are not gamma rayers. It is also an object to provide a neutron source, having a practicably constant strength and a practicably long half-life, which contains, as an active constituent, an alpha particle emitter of short half-life which is continually replenished.

Other objects and advantages of the present invention will become apparent from the following detailed description when considered with the drawings, in which.

Figures 1, 2:
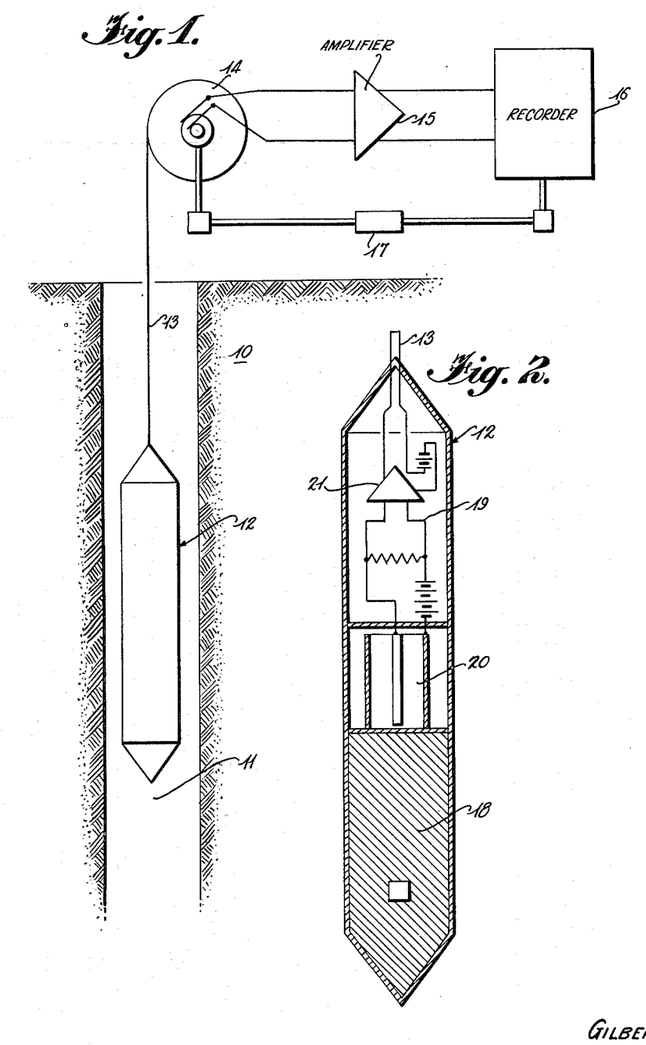
Figure 1 is a diagrammatic illustration of a neutron logging operation.
Figure 2 is an enlarged vertical sectional view of the subsurface instrument.

Referring to the drawings in detail, particularly Figure 1, there is illustrated a well surveying operation in which a fragment of the surface 10 of the earth is shown in vertical section. A well 11 penetrates the earth's surface and may or may not be cased. Disposed within the well is the subsurface instrument 12 of the well logging system which additionally comprises a cable 13 for suspending the instrument in the well, a drum 14 from which cable is paid out or on which cable is wound when causing the capsule 12 to traverse the well, electrical connections from slip-rings on the axle of the drum 14 to an amplifier 15, which is turn is electrically connected to a recorder 16 in a conventional manner. Recorder 16 is driven through a transmission 17 by the drum 14 as the cable is paid out from or wound thereon. The record thus made by the recorder as the capsule 12 traverses the drill hole will be in correlation with depth.

As shown in Figure 2, the capsule 12 comprises a neutron source 18 forming the bottom portion thereof and a gamma-radiation detecting system indicated generally as 19 which makes up the upper portion of the capsule. The gamma-radiation detecting equipment 19 can be such as that disclosed in Patent No. 2,349,225, or such as that shown in Patent No. 2,390,965. For purposes of describing this invention, an ionization chamber 20 is shown as the radiation sensitive element. As disclosed in Patent No. 2,308,361, the operation of a system of this character when producing a neutron log is that the capsule 12, made up of a source of neutrons 18 and a gamma-radiation detection system 19, is caused to traverse a well. Neutrons emitted from the source enter the walls of the well and by nuclear reaction with matter contained in the walls, produce gamma radiation in amounts proportional to the lithological characteristics of the materials of which the walls are formed. These gamma radiations produced by nuclear reactions in the strata are detected by the gamma-radiation detector 20 by producing electrical signals that are related in magnitude to the intensity of the gamma radiation detected, and these signals are amplified by an amplifier 21 and transmitted over conductors contained in the cable 13 to the surface of the earth, where if necessary, they are further amplified by the amplifier 15 and recorded by the recorder 16 in correlation with the depth at which they were detected.

It is to be understood that any conventional well-logging gamma-radiation detecting and recording system can be employed in conjunction with a proper neutron source while practising that form of the present invention in which a neutron log is made directly.

Commercially a log made by the above described operations is known as a neutron log. This is true although no neutrons are directly detected and recorded; the record is one of gamma radiation intensity versus depth. Those working in the art have heretofore assumed that such a log, made with the standard radium-beryllium source, truly represents an effect produced in the strata by irradiating the strata with neutrons. That is, the log was purported to be a measurement of the gamma radiation produced by the nuclear reaction of neutrons and elements contained in the strata versus depth. Research, however, has shown that this is not the case. The log made by the commercial neutron logging method is a composite log that is produced while recording at least two effects. These effects are:

1. Gamma radiation arising from the interaction of neutrons with substances in the strata.

2. Gamma radiation which has been emitted by the neutron source and by direct or indirect paths arrives at the detector.

The first of these effects is the desired effect which correlates with the lithological properties of the formations penetrated by a well and serves admirably as an index by means of which the formations can be identified. The other effect is undesirable since it leads to erroneous interpretation of the log. Therefore we have found that in order for a neutron log to truly depict the lithological characteristics of the formations penetrated by a well, that the second effect must be minimized or largely eliminated and that the first effect must be augmented.

Figure 3A:
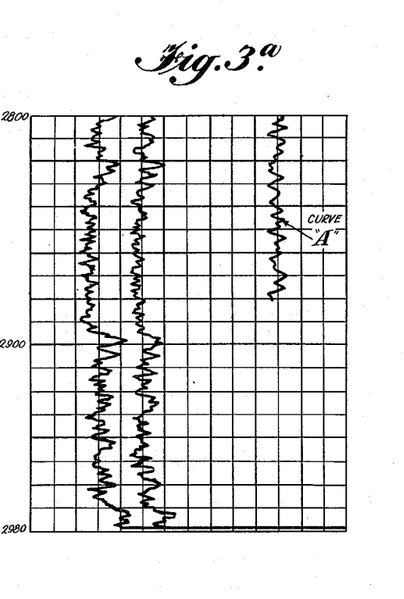
Figures 3a to 3h are reproductions of sections of well logs made of a particular well from a depth of 2800 feet to 2980 feet under various conditions.

This is illustrated in Figures 3a to 3h. In these figures there are reproduced sections of logs made of a particular well from a depth of 2800 feet to a depth of 2980 feet. Figure 3a is a standard neutron log in duplicate; that is, it is a log which has been made while using the so-called standard radium-beryllium neutron source. The well in which the two logs of Figure 3a were made was of substantially uniform diameter over the distance logged. Therefore the variation in gamma radiation which was emitted by the neutron source and which had been scattered by the strata was substantially negligible. As a result, the two standard neutron logs depict with acceptable accuracy the lithological characteristics of the strata in the well.

Figure 3B:
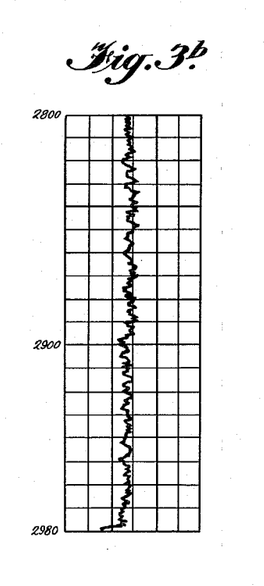

In order to determine the effect of gamma radiation which was emitted by the neutron source and scattered by the strata lining the well, a log was made of the same portion of the well while using a neutron-free gamma-ray source which emitted gamma radiation of the same intensity as that emitted by the standard neutron source. This log is shown in Figure 3b. It will be noted that the variation of detected scattered gamma radiation is quite small in comparison to the variation of detected gamma radiation in Figure 3a. Therefore, from this log it is safe to assume that the two logs shown in Figure 3a are of gamma radiation produced by neutron reactions in the strata versus depth.

Figure 3C:
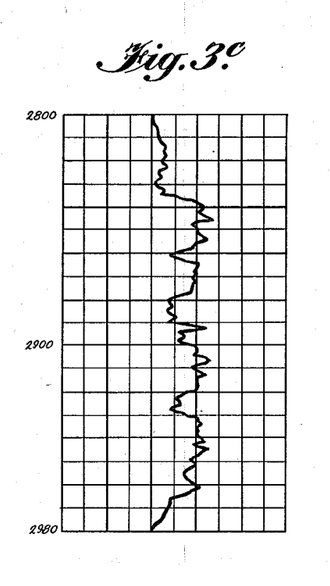
Figure 3D:
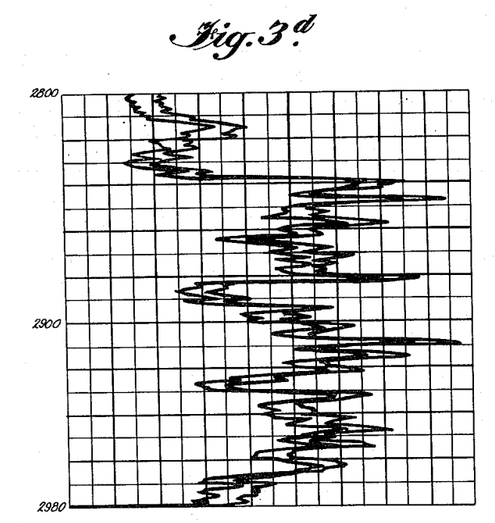

In order to show the variation in the effect produced by gamma radiation which has been scattered by the formations and has reached the detecting instrument, the same well, logs of which are shown in Figures 3a and 3b, was shot with nitroglycerine. A caliper log was then made of that portion of the well between the depths of 2800 feet and 2980 feet. This caliper log is shown in Figure 3c. This log shows that enormous cavities were created in the well, and the inner walls thereof are anything but smooth. The diameter of the hole varies over a wide range. After the well had been shot a standard neutron log was again made. By separate operations this log was duplicated. These two logs are shown in Figure 3d. By comparing these two logs to those shown in Figure 3a it will be seen that they in no way resemble each other. All parameters other than the diameter of the drill hole remained constant when the logs of Figures 3a and 3d were made. This clearly illustrates the effect of the variation in well diameter on the standard neutron log. Although the effect of large changes in well diameter are illustrated by these logs, it has been found that variations of as little as ½″ in well diameter will produce variations in the standard neutron log which might lead to erroneous interpretation.

Figure 3E:
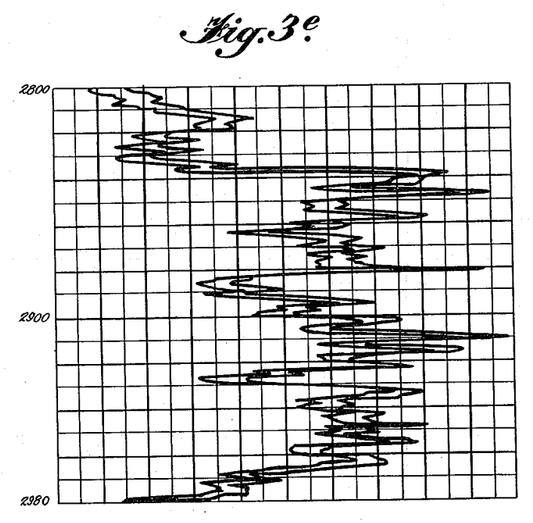

Now compare the logs shown in Figure 3e to those shown in Figure 3d. The two logs shown in Figure 3e are logs which have been made while using a neutron-free gamma-ray source, the gamma-rays emitted from which were of the same intensity as those emitted by the standard neutron source. At a glance these logs appear to be duplicates. This is because the effect of scattered gamma radiation which has been emitted by the source has varied widely with the hole diameter. In fact, the logs made with the neutron-free gamma-ray source (Figure 3e), correlate with the caliper log (Figure 3c). The log of Figure 3e truly represents the variation in detected scattered gamma radiation which was emitted by the gamma-ray source. The log of Figure 3d is essentially a caliper log of the well rather than a log of lithological characteristics.

Figure 3F:
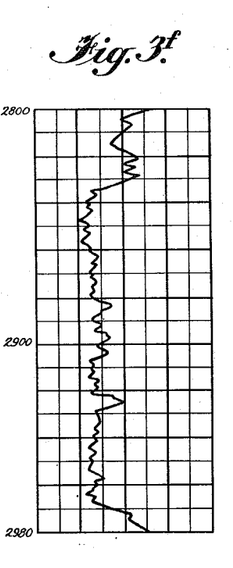

Since the variation of detected scattered gamma radiation is for the greater part attributable to the variation in well diameter, if one subtracts the logs made while using a neutron-free gamma-ray source from those used by the standard neutron source, a log should be obtained which would truly represent a measure of the gamma radiation produced by neutron reactions in the strata versus depth. This has been done. The result is illustrated in Figure 3f. A comparison of the log of Figure 3f with the log shown in Figure 3a will show that they closely correlate. If one desires to make a neutron log which truly depicts the lithological characteristics of the strata penetrated by a well, the effect of gamma radiation given off by the neutron source, scattered by the strata and thereafter reaching the detector must be taken into consideration and largely eliminated. As clearly illustrated above in Figures 3a to 3f, in wells where the diameter varies from point to point in depth, the effect of the detected scattered gamma radiation is to obscure, nullify and even reverse the deflections of the log that are due to detected gamma rays which are produced by neutron reactions in the formations.

We have found that the solution to this problem is to use a neutron source which does not emit more than a tolerable number of photons of gamma radiation per neutron produced. As pointed out above, radium D, in secular equilibrium with its daughter products, and beryllium make a neutron source which is ideally suited for neutron logging when a shield of practical density and thickness is used about the reactant materials. The neutron producing reaction of such a source will produce one photon of gamma radiation for each neutron produced. The use of a shield of practical density and thickness will attenuate the number of photons of gamma radiation to approximately one photon of gamma radiation for every four neutrons emitted from the external surface of the source. This ratio of gamma radiation to neutrons is well within the tolerable limits of a practical neutron source. Primary gamma radiation of such intensity, after having been scattered by the formation adjacent the drill hole, is negligible. The intensity of the gamma radiation which arises from neutron reactions with elements contained in the formations is sufficiently greater by comparison that variations due to lithological characteristics of the strata are outstanding on the log over any effect produced by the scattered gamma radiation.

Figure 3G:
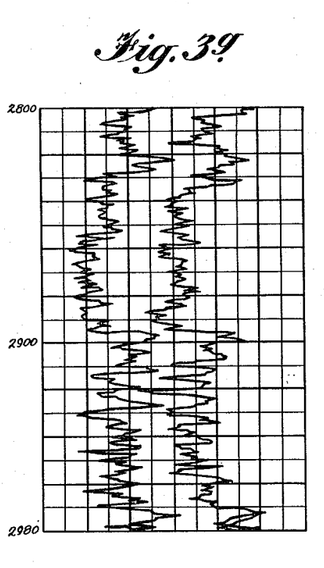
Figure 3H:
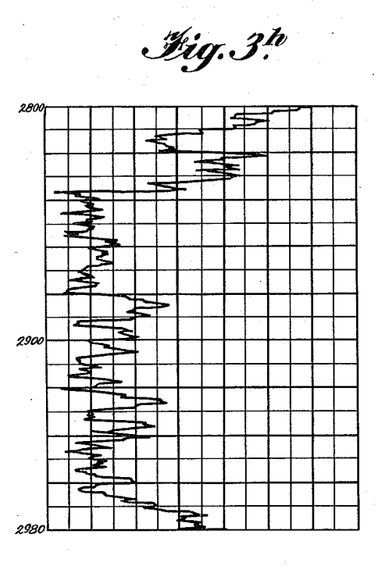

The same section of the particular well, whose logs have been discussed above in connection with Figures 3a to 3f, has been logged while using a radium D, in equilibrium with its daughter products, and beryllium neutron source, it being understood that the shield of practical density and thickness is an essential element of the source. A log made before the well was shot is illustrated in Figure 3g. Except for a difference in overall amplitude, due to a difference in sensitivity of the recorder, the log shown in 3g compares favorably with the subtraction log shown in Figure 3f. A log made with the same source after that section of the well has been shot is shown in Figure 3h. Except for general overall variations in amplitude, this log also correlates quite closely with the subtraction log of Figure 3f. Therefore the radium D log will portray lithological characteristics of the strata even when the diameter of the hole varies.

Although the correlation of the radium D logs with the subtraction log of Figure 3f is quite good, the reproducibility of details of the logs is not as good as it might be. This is due to the fact that only a small amount of radium D for the neutron source was available. This amount of radium D represents approximately the lower limit that can be used in a practical neutron source, whereas approximately five times this amount would be more desirable. As the curie activity of the radium D in the source is increased, more neutrons are produced in the source and emitted thereby. The reproducibility of the radium D-neutron-source logs increases substantially as the square root of the number of neutrons emitted by the source. The more neutrons there are entering the strata the more gamma radiation will be produced by their reactions with elements in the strata, resulting in a substantially corresponding increase in the number of photons of gamma radiation which produce ionization processes in the detector. In fact, if the intensity of the useful gamma radiation is sufficiently great, the sensitivity of the recording system can be reduced to a point where its response to the statistical or random processes will be negligible. Relatively speaking, the use of a radium D-beryllium source of adequate strength will minimize or largely eliminate the undesired effects and augment the desired effect.

In addition to the use of radium D and its daughter products as an alpha rayer in a neutron source for well logging actinium, atomic number 89 and mass number 227, in secular equilibrium with its daughter products can be used. As pointed out above, actinium and its daughter products have five alpha rayers, each of which emits alpha radiation having energies approximately 1 m. e. v. higher than the alpha radiation emitted by radium, atomic number 88 and mass number 226, and its daughter products.

Although actinium, atomic number 89 and mass number 227, in equilibrium with its daughter products, when used as an alpha rayer in a neutron source, may be used in the same manner as radium and radium D, it is not the equivalent of either. The neutron source produced by the use of actinium has properties which are entirely different from those produced by the use of radium or radium D as alpha rayers. From the point of view of neutrons produced per millicurie activity, actinium is twice as good as radium, atomic number 88 and mass number 226, plus its products, and twelve times better than radium D plus its products. Actinium further differs from radium, atomic number 88 and mass number 226, in that the gamma radiation naturally emitted thereby has energies which range from 0.3 to 0.4 m. e. v. in contrast to energies of approximately 2 m. e. v. for radium and its daughter products.

The claims of this application are directed to a substantially gamma-ray free neutron source. Other novel features disclosed but not claimed have been made the subject matter of companion applications.

We claim:

1. Neutron well logging apparatus which comprises a source of neutrons of the alpha rayer-target type, in which the alpha rayer consists of at least one short half-life member present in a radioactive series and is in secular equilibrium with a parent member of relatively long half-life and all members of the series being substantially gamma-ray free, whereby the alpha-rayer will be maintained substantially free of gamma radiation and maintained at substantially constant alpha-ray-emitting strength for a period of time at least as long as its normal half-life, and in which the target material is disposed in neutron-producing relationship with said alpha rayer, means for moving said source of neutrons within a well in proximity to respective formations through which the well extends thereby to bombard said formations with neutrons, a detector associated with said source of neutrons for detecting gamma radiation produced by the action of the neutrons in the respective formations, and means for recording said detected radiation in correlation with well depth.

2. Neutron well logging apparatus which comprises a source of neutrons of the alpha rayer-target type, in which the alpha rayer consists of a radioactive series which is 89 actinium 227 in secular equilibrium with its daughter products, whereby the alpha-rayers of the daughter products will be maintained substantially free of gamma radiation and maintained at substantially constant alpha-ray-emitting strength for a period of time at least as long as their normal half-lives, and in which the target material is disposed in neutron-producing relationship with said alpha rayer, means for moving said source of neutrons within a well in proximity to respective formations through which the well extends, thereby to bombard said formations with neutrons, a detector associated with said source of neutrons for detecting gamma radiation produced by the action of said neutrons in the respective formations, and means for recording said detected radiation in correlation with well depth.

3. Neutron well logging apparatus which comprises a source of neutrons of the alpha rayer-target type, in which the alpha rayer consists of a radioactive series which is radium D in secular equilibrium with its daughter products, whereby the alpha-rayer daughter product will be maintained substantially free of gamma radiation and maintained at substantially constant alpha-ray-emitting strength for a period of time at least as long as its normal half-life, and in which the target material is disposed in neutron-producing relationship with said alpha rayer, means for moving said source of neutrons within a well in proximity to respective formations through which the well extends thereby to bombard said formations with neutrons, a detector associated with said source of neutrons for detecting gamma radiation produced by the action of said neutrons in the respective formations, and means for recording said detected radiation in correlation with well depth.

4. A method of producing neutron well logs which comprises passing a substantially gamma ray-free source of neutrons of the alpha-rayer-target type within a well, simultaneously and with movement corresponding to the movement of the source of neutrons traversing the well with a detector to measure gamma radiation produced by neutron processes in the formation penetrated by the well, continuously and simultaneously producing a log from the measurement, representing the said detected gamma radiation in correlation with well depth, and maintaining the alpha-rayer in the source of neutrons substantially free of gamma radiation and at substantially constant alpha-ray-emitting strength for a period of time at least as long as its normal half-life by associating with the alpha-rayer a gamma-ray-free parent substance that will continuously decay and replenish the alpha-rayer at a rate that is substantially equivalent to its rate of decay.

ROBERT E. FEARON.
JEAN M. THAYER.
GILBERT SWIFT.

REFERENCES CITED

The following references are of record in the file of this patent:

UNITED STATES PATENTS

| Number | Name | Date |
|---|---|---|
| 2,469,462 | Russell | May 10, 1949 |

Patent No. 2,515,502

Certificate of Correction

ROBERT E. FEARON ET AL.

July 18, 1950

It is hereby certified that error appears in the printed specification of the above numbered patent requiring correction as follows:

Column 1, line 49, after the word "this" insert *is*; column 2, line 7, for "or" read *of*; column 3, line 29, for "bamma" read *gamma*; column 8, line 45, for "is", first occurrence, read *in*; column 11, line 73, for "ionization" read *ionizing*; column 13, line 3, for "neutron-producting" read *neutron-producing*; and that the said Letters Patent should be read as corrected above, so that the same may conform to the record of the case in the Patent Office.

Signed and sealed this 19th day of December, A. D. 1950.

[SEAL]

THOMAS F. MURPHY,
*Assistant Commissioner of Patents.*